(12) United States Patent
Dominguez (10) Patent No.: US 11,147,240 B2
(45) Date of Patent: Oct. 19, 2021

(54) ENTERTAINMENT AND TRAINING DEVICE FOR ANIMALS

(71) Applicant: Raul Leon Dominguez, Hayward, CA (US)

(72) Inventor: Raul Leon Dominguez, Hayward, CA (US)

( * ) Notice: Subject to any disclaimer, the term of this patent is extended or adjusted under 35 U.S.C. 154(b) by 381 days.

(21) Appl. No.: 16/139,304

(22) Filed: Sep. 24, 2018

(65) Prior Publication Data

US 2019/0090456 A1 Mar. 28, 2019

Related U.S. Application Data

(60) Provisional application No. 62/562,717, filed on Sep. 25, 2017.

(51) Int. Cl.
*A01K 15/02* (2006.01)

(52) U.S. Cl.
CPC .......... *A01K 15/025* (2013.01); *A01K 15/021* (2013.01)

(58) Field of Classification Search
CPC .......... A01K 15/025–026; A63B 65/00; A63B 65/10; A63B 65/12
USPC ....... 473/506, 508, 615, 423, 424, 427, 430, 473/575
See application file for complete search history.

(56) References Cited

U.S. PATENT DOCUMENTS

| | | | | |
|---|---|---|---|---|
| 3,731,925 A * | 5/1973 | Caldwell | .............. | A01K 15/025 473/424 |
| 4,938,478 A * | 7/1990 | Lay | .................... | A63B 69/0091 473/423 |
| 5,119,001 A * | 6/1992 | Moore | ............... | A63B 69/0002 473/424 |
| 5,390,629 A * | 2/1995 | Simone | ................ | A01K 15/025 119/711 |
| 5,467,978 A * | 11/1995 | Paluch | ............... | A63B 69/0079 473/429 |
| 5,505,161 A * | 4/1996 | Swendseid | ......... | A63B 69/0091 473/423 |
| 5,904,118 A * | 5/1999 | Markham | ............ | A01K 15/025 119/707 |
| 6,142,889 A * | 11/2000 | Schaubach | ......... | A63B 69/0079 473/415 |
| 6,401,665 B1 * | 6/2002 | Gentile | ................ | A01K 15/025 119/707 |
| 6,907,688 B2 * | 6/2005 | Brint | ..................... | A01M 31/06 40/417 |
| 7,115,051 B2 * | 10/2006 | Hansberry | ......... | A63B 69/0002 473/423 |

(Continued)

FOREIGN PATENT DOCUMENTS

DE    102012206838 B3 *  7/2013  ........... A01K 15/025

*Primary Examiner* — Peter M Poon
*Assistant Examiner* — Morgan T Barlow
(74) *Attorney, Agent, or Firm* — Gerald R. Prettyman (57) ABSTRACT

An entertainment and training device (toy) for animals, specifically for domestic pets such as dogs, has a tube or tubes, through which a flexible material, such as a rope, is passed from a near end of the tube or tubes and out a far end of the tube or tubes. Attached at a far end of the rope is an object, which can be shaped as a flat disk, an oblong disk, a ball, a tail, a wing, or other shape, and which is thrown to entertain, train, and exercise the animal. A braking device at a near end of the rope prevents the rope from passing into and out of the far end of the tube or tubes and allows easy retrieval of the thrown object.

26 Claims, 10 Drawing Sheets

(56) References Cited

U.S. PATENT DOCUMENTS

| | | | |
|---|---|---|---|
| 7,691,013 B2* | 4/2010 | Emerson | A63B 69/0088 473/459 |
| 8,997,695 B2* | 4/2015 | Riding | A01K 15/025 119/708 |
| 9,814,215 B2* | 11/2017 | Renforth | A01K 15/025 |
| 9,848,585 B1* | 12/2017 | Perozo | A01K 5/00 |
| 10,609,905 B2* | 4/2020 | Renforth | A01K 15/025 |
| 2004/0009833 A1* | 1/2004 | Selevan | A63B 69/0086 473/576 |
| 2004/0097305 A1* | 5/2004 | Kreusser | A63B 69/0084 473/422 |
| 2005/0150468 A1* | 7/2005 | Fleischhacker | A01K 15/025 119/708 |
| 2007/0119384 A1* | 5/2007 | Ritchey | A01K 15/025 119/708 |
| 2009/0205580 A1* | 8/2009 | Tiefel | A01K 15/025 119/708 |
| 2010/0263601 A1* | 10/2010 | Quinn | A01K 15/024 119/622 |
| 2011/0165969 A1* | 7/2011 | Gu | A63B 69/0091 473/423 |
| 2011/0277697 A1* | 11/2011 | Lipscomb | A01K 15/025 119/708 |
| 2013/0053188 A1* | 2/2013 | Moore | A63B 69/0091 473/423 |
| 2013/0167779 A1* | 7/2013 | Axelrod | A01K 15/025 119/707 |
| 2013/0192536 A1* | 8/2013 | Lohmann | A01K 15/025 119/707 |
| 2013/0340684 A1* | 12/2013 | Townsend | A01K 15/025 119/708 |
| 2014/0228156 A1* | 8/2014 | Riggle | A63B 69/0002 473/424 |
| 2014/0360440 A1* | 12/2014 | Fox | A01K 27/004 119/796 |
| 2016/0262351 A1* | 9/2016 | Hamill | A01K 15/027 |
| 2017/0311568 A1* | 11/2017 | Floyd | A01K 15/026 |
| 2018/0014507 A1* | 1/2018 | Lorig | A01K 15/026 |
| 2018/0146643 A1* | 5/2018 | Pennington | A01K 15/025 |
| 2018/0271054 A1* | 9/2018 | Bales | A01K 5/0114 |
| 2019/0246606 A1* | 8/2019 | Harms | A01K 15/025 |
| 2019/0261602 A1* | 8/2019 | Powell | A01K 15/025 |
| 2019/0269100 A1* | 9/2019 | Evans | A61M 21/02 |

* cited by examiner

ENTERTAINMENT AND TRAINING DEVICE FOR ANIMALS

CROSS-REFERENCE TO RELATED APPLICATION

This application claims the benefit of priority of U.S. Provisional Patent Application 62/562,717 filed Sep. 25, 2017, and titled "TRAINING TOY FOR DOMESTIC PETS," the disclosure of which is incorporated by reference.

STATEMENT REGARDING FEDERALLY SPONSORED RESEARCH OR DEVELOPMENT

Not Applicable

BACKGROUND OF THE INVENTION

Field of Invention

The invention relates generally to the field of entertainment and training devices for animals and more specifically to entertainment and training devices animals for domestic pets, such as dogs.

Description of Related Art

Animals, dogs in particular, often live in a social hierarchy. Alpha animals are assertive and dominant, and are generally willing to play and chase an object. Beta animals can be willing to play and chase an object if encouraged. Omega animals, being shy and lacking confidence, may need additional encouragement to play.

Entertainment and training devices for animals are often simplistic, such as a ball or flying disc. Even if incorporating an assist device, such as the stick and cup device adapted from Lacrosse, the device minimizes activity for the person. These devices are also simplistic for the animal, to the extent that the devices do not lend well for training. Training sessions similarly tend to be simplistic and low activity.

SUMMARY OF THE INVENTION

Disclosed is an apparatus comprising an entertainment and training device for animals (100). The entertainment and training device for animals incorporates, inter ilia, at least one tube to comprise a tube assembly having a tube assembly proximal end (125) and a tube assembly distal end (120).

A first flexible and durable material (135) travels the length of the tube assembly (115). From the tube assembly proximal end (125), the first flexible and durable material (135) continues and terminates (135A) with a brake device. From the tube assembly distal end (120), the first flexible and durable material (135) continues and terminates (135B) with an at least one affixment device (145) coupled to an at least one target object (140). A second flexible and durable material (135) may cover the an at least one affixment device (145) and a portion of the first flexible and durable material (135) to protect both an animal from injury if biting the an at least one affixment device (145) as well as to protect the first flexible and durable material (135) and the an at least one affixment device (145).

The an at least one target object (140) may be configured to provide for entertainment and training of animals as a flat disk, an oblong disk, a ball, a tail, a wing, or other shape. The an at least one target object (140) may be configured with an inner pouch, which may be sealed, open, or sealable, and may contain a sound emitting device, or other playful or training attractant. In being configured with an inner pouch, the inner punch may be unlined, as with the inner pouch not being observable as a separate structure, or may be lined.

The an at least one tube (110) may be transparent, translucent or opaque. The an at least one tube (110) may comprise a metal tube, a plastic tube, a reinforced paper tube, or any tubular material. A plurality of an at least one tube (110) may be used. The plurality of an at least one tube (110) may comprise one or more of the an at least one tube (110) configured as transparent, one or more of the an at least one tube (110) configured as translucent, one or more of the an at least one tube (110) configured as opaque, one or more of the an at least one tube (110) configured as a metal tube, one or more of the an at least one tube (110) configured as a plastic tube, one or more of the an at least one tube (110) configured as a reinforced paper tube, or any combination of these configurations.

The tube assembly may be configured to a determinate length (130) for a specific activity and a specific animal. The tube assembly (115) may have a determinate length (130) of less than one meter. The tube assembly (115) may have a determinate length (130) of at least one meter.

DETAILED DESCRIPTION OF THE INVENTION

Figure 1:
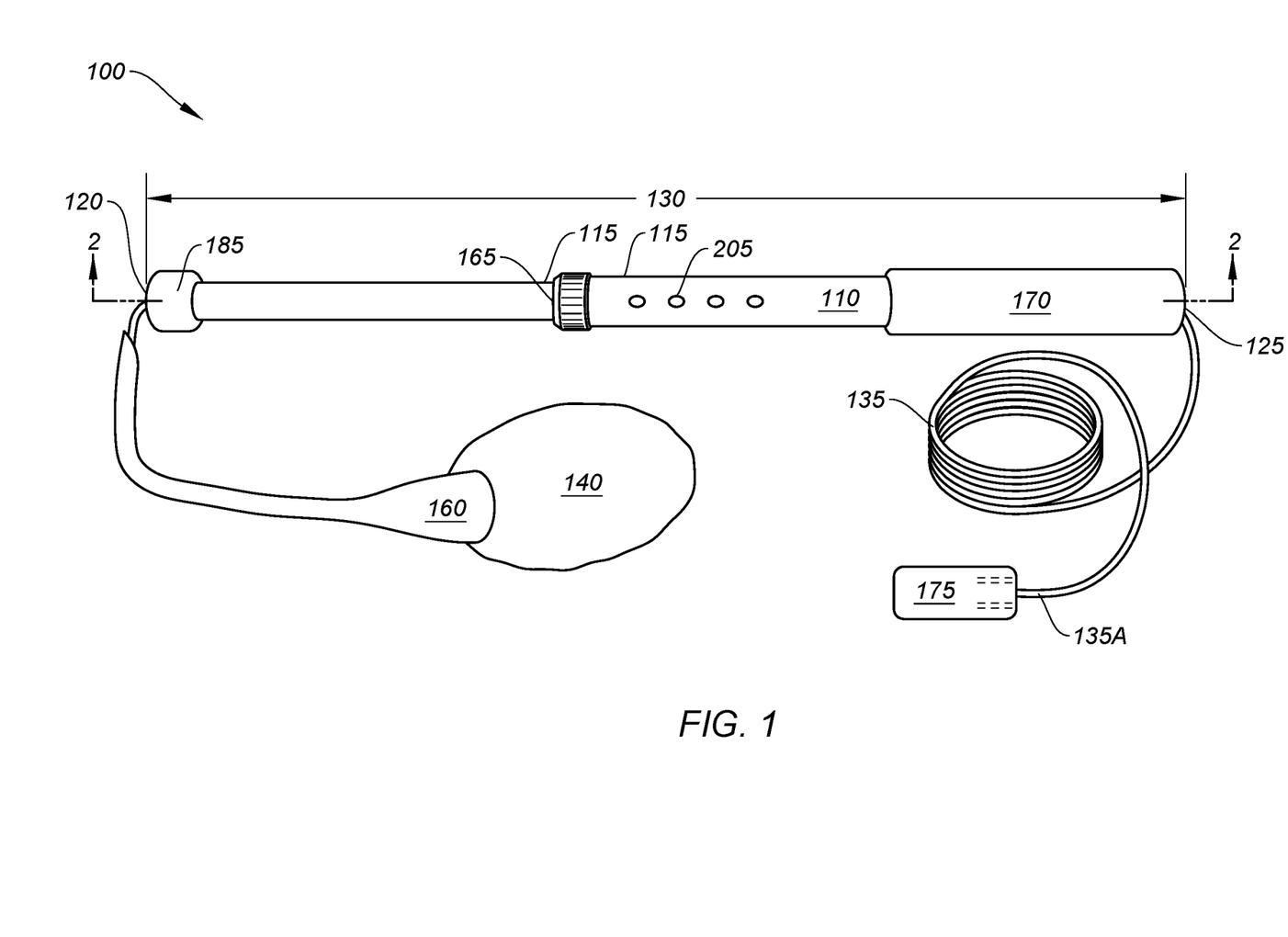
FIG. 1 shows an entertainment and training device for animals (100).

FIG. 1 shows an entertainment and training device for animals (100). The entertainment and training device for animals (100) incorporates, inter alia, an at least one tube (110) forming a tube assembly (115) with the tube assembly (115) having a tube assembly distal end (120) and a tube assembly proximal end (125). The tube assembly (115) may have a determinate length (130) for a specific activity and a specific animal.

Also shown is a first flexible and durable material (135), an at least one target object (140), an at least one affixment device (145) a second flexible and durable material (160), a handgrip (170), a brake (175), a distal end bumper (185), and an at least one view hole (205).

The an at least one tube (110) of the entertainment and training device for animals (100) provides a firm extension channel for use of the entertainment and training device for animals (100). The an at least one tube (110) may be made of any firm material. The firm material may be plastic, such as acrylic, polyvinyl chloride, polycarbonate, polyethylene, polypropylene, HIPS plastic, etc. The firm material may be metal, such as metal, such as aluminum, steel, etc., although typically a light density material would be easier to use. The firm material may be other materials including fiberglass, graphite, reinforced paper, etc. The an at least one tube (110) may be may be transparent, translucent or opaque.

A plurality of an at least one tube (110) may be used. The an at least one tube (110) may comprise more than of an at least one tube (110) to form a tube assembly (115). The tube assembly (115) may be made of one or more of the an at least one tube (110) inserted with a smaller outer diameter tube partially inside a larger inner diameter tube, i.e., telescopically. The tube assembly (115) may be one or more tubes coupled end-to-end, or combined with multiple means.

The plurality of an at least one tube (110) may comprise one or more of the an at least one tube (110) configured as transparent, one or more of the an at least one tube (110) configured as translucent, one or more of the an at least one tube (110) configured as opaque, one or more of the an at least one tube (110) configured as a metal tube, one or more of the an at least one tube (110) configured as a plastic tube, one or more of the an at least one tube (110) configured as a reinforced paper tube, or any combination of these configurations.

The tube assembly (115) operates to provide a determinate length (130) for the entertainment and training device for animals (100). The determinate length (130) operates to provide a balance of a length of a first flexible and durable material (135), a weight of an at least one target object (140), and an applied momentum to the at least one target object (140). The determinate length (130) of the an at least one tube (110) may be short for some activities, or long for some activities. The determinate length (130) of the an at least one tube (110) may be short for a specific animal or long for other animals. A determinate length (130) for suitable use includes 18 inches.

The first flexible and durable material (135) operates to couple the at least one target object (140) to the at least one affixment device (145) so as to (1) provide for controlled deployment of the at least one target object (140), (2) provide for ease of retrieval of the at least one target object (140) to the at least one tube (110), and (3) use of the first flexible and durable material (135) as part of the entertainment or training exercise.

The first flexible and durable material (135) may be made of any material which is both flexible and durable. The first flexible and durable material (135) may be made of a natural material such as cotton, hemp or jute, a synthetic material such as nylon, polypropylene, a nylon-polypropylene blend, or a natural-synthetic blend.

Though users may prefer an opaque, i.e., easily visible, first flexible and durable material (135), the first flexible and durable material (135) may be translucent, and circumstances can be foreseen when the first flexible and durable material (135) should be transparent.

Though described flexible and durable, as these qualities function for many uses, these qualities of the first flexible and durable material (135) may be balanced or degraded as appropriate for entertainment or training opportunities. Thus, the first flexible and durable material (135) may instead be, perhaps configured as wire, of steel, aluminum, copper, another metal, or a blend of one or more metals.

Various qualities may enhance suitability of a material for use as the first flexible and durable material (135). A lightweight material would be easier to handle. A tight zigzag stitch would make the material stiff and therefore less likely to tangle, as well as less likely to retain moisture (which makes the rope heavier), and a zigzag material improves grip on the first flexible and durable material (135).

The an at least one target object (140) serves as the attractive object of entertainment and training for a subject animal. Many possible configurations for the an at least one target object (140) exist, including a stuffed toy, a soft ball, a sound emitting device (e.g. a squeaky object), an elongated 'furry' object, or a serial or parallel configuration of more than one of the an at least one target object (140). A flat or unfilled configuration of the an at least one target object (140) may be used.

The an at least one target object (140) may be sized for a specific animal. The an at least one target object (140) may be about 3 inches in length for smaller pets. The an at least one target object (140) may be about 5 inches in length for medium size pets.

The an at least one target object (140) may be made of many materials including cotton, rubber, other natural materials, or a combination of natural materials. The an at least one target object (140) may be made of nylon, other synthetic materials, or a combination of synthetic materials. The an at least one target object (140) may be made of a combination of natural and synthetic materials.

High weight (e.g., 1000+ denier) nylon blends such as ballistic nylon or Cordura® provide a slippery texture for which the subject animal may have to work more to secure a bite onto the an at least one target object (140). These blends can also provide a tight outer surface weave for a water repellent and puncture resistant surface.

The second flexible and durable material (160) provides a protective surface over the distal end of the first flexible and durable material (135) at the an at least one target object (140). As the subject animal will bite at the an at least one target object (140), the subject animal will likely bite at the first flexible and durable material (135) and the attachment mechanism, (the at least one affixment device (145) as described in FIG. 3.

The second flexible and durable material (160) must therefore prevent damage to the first flexible and durable material (135) and to at the an at least one target object (140), and most importantly, prevent injury to the subject animal.

The second flexible and durable material (160) may be made of any material which is both flexible and durable. The second flexible and durable material (160) may be made of a natural material such as cotton, hemp or jute, a synthetic material such as nylon, polypropylene, a nylon-polypropylene blend, or a natural-synthetic blend. The second flexible and durable material (160) may be a high weight woven material of 1000 denier or greater.

The handgrip (170) is placed around the tube assembly proximal end (125) of the at least one tube (110) and provides a graspable surface for holding onto the entertainment and training device for animals (100). The handgrip may be made of any material that provides a graspable surface for holding onto the entertainment and training device for animals (100). Some materials include friction tape, cork, wood, open-cell foam and closed-cell foam. A preferred material would be soft that's comfortable for both large and small hands as well as designed not to fatigue the user, exposed to repetitive motions, referring to shoulder, arm, hand and neck. The handgrip (170) may be of any length suitable for providing a graspable surface for holding onto the entertainment and training device for animals (100).

The handgrip (170) may be made of a tubular construction to accommodate the proximal end of the at least one tube (110). The proximal end of the at least one tube (110) may be flared to accommodate securing the handgrip (170).

The brake (175) serves to stop movement of the first flexible and durable material (135) as the proximal end (135A) of the first flexible and durable material (135) reaches the tube assembly proximal end (125) of the at least one tube (110), and thus prevent the first flexible and durable material (135) from exiting the entertainment and training device for animals (100) during use.

The brake (175) may be any suitable device for preventing the first flexible and durable material (135) from exiting the entertainment and training device for animals (100) during use. One device might be a large knot in the first flexible and durable material (135), although a knot could cause injury. Another device might be a soft, but firm material tied to the proximal end of the first flexible and durable material (135) with the material slightly larger than the internal diameter of the at least one tube (110). Such a device might be a strip of nylon or a foam ball.

The brake (175) should be lightweight as the brake will be moving during use of the entertainment and training device for animals (100) and may strike the user or other close-by person or animal.

An at least one view hole (205) may be used with a configuration of the entertainment and training device for animals (100) having more than at least one tube (110). Placement of an at least one view hole (205) in an at least one tube (110) comprising the proximal end and near where a first of an at least one tube (110) is coupled to a second of at least one tube (110) enable the users to view where the second of at least one tube (110) is within the first of an at least one tube (110).

Figure 2:
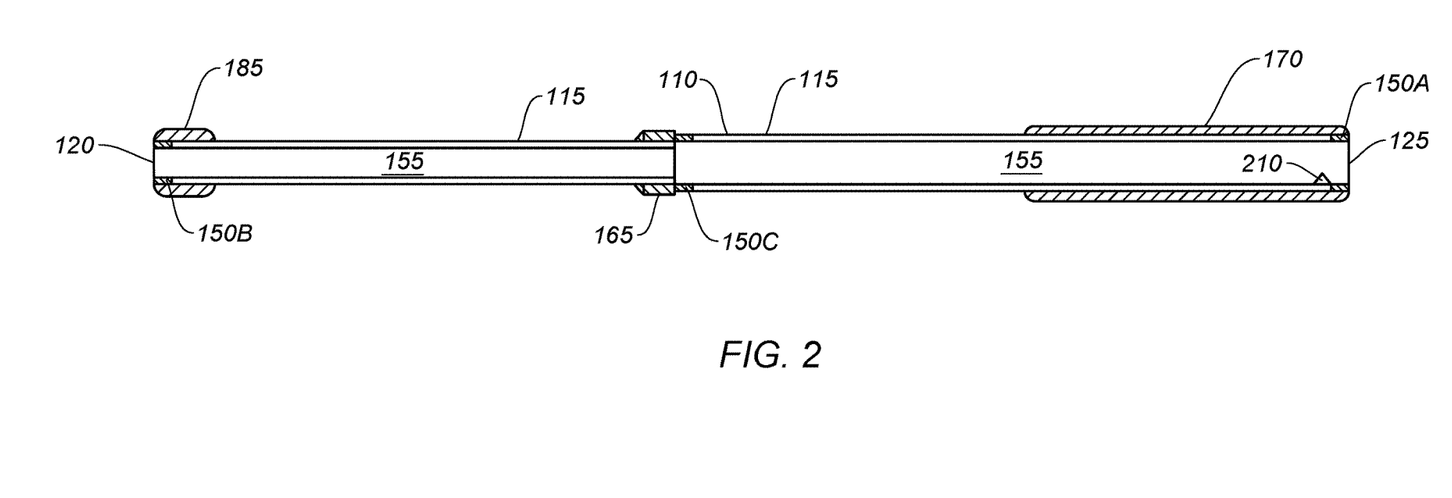
FIG. 2 shows a cut-away view of entertainment and training device for animals (100).

FIG. 2 shows a cut-away view of entertainment and training device for animals (100). Shown in FIG. 2 are the at least one tube (110) forming a tube assembly (115), a tube assembly distal end (120) and a tube assembly proximal end (125) of the at least one tube (110) forming a tube assembly (115), a plurality of friction minimizing collars (150A, 150B, 150C, etc.), an at least one friction minimizing surface (155) within the at least one tube (110), a tube securing collar (165), and an at least one detent (210).

As shown in FIG. 2, the at least one tube (110) may have a friction minimizing collar (150A) at the tube assembly proximal end (125) of the tube assembly (115), a friction minimizing collar (150C) at the midpoint of the tube assembly (115), and a friction minimizing collar (150B) at a tube assembly distal end (120).

The friction minimizing collar (150A, etc.) may be any material which would reduce friction of the first flexible and durable material (135) while entering and exiting the tube assembly (115) during use. Suitable devices include brass grommets, thick metal washers, hollow wood spacers, etc.

The friction minimizing collars (150A, 150B, etc.) should be securely affixed within the at least one tube (110). In this way, the friction minimizing collars (150A, 150B) operate to reduce static and dynamic friction on the first flexible and durable material (135) as the first flexible and durable material (135) travels though the at least one tube (110), thereby improving performance for an applied momentum to the at least one target object (140). Though described as plural (i.e., one friction minimizing collar at the distal end, another at the proximal end), as that configuration works best, circumstances can be foreseen when only one friction minimizing collar (150A or 150B) might be used.

If the at least one tube (110) has long length, or there is more than at least one tube (110) forming a tube assembly (115), the entertainment and training device for animals (100) may have a third or more friction minimizing collars (150C, etc.) spaced within the tube assembly (115).

Also present may be an at least one friction minimizing surface (155) within the at least one tube (110). The at least one friction minimizing surface (155) is affixed internally to the at least one tube (110) provide a determined balance of static friction and dynamic friction such that the internal surface along with the length of the at least one tube (110) will impact a minimal drag on the first flexible and durable material (135) as the first flexible and durable material (135) travels though the at least one tube (110), thereby improving performance for an applied momentum to the at least one target object (140).

Some configurations of the entertainment and training device for animals (100) may have a tube securing collar (165) to secure a first an at least one tube (110) to a second an at least one tube (110) to form a tube assembly (115). The tube securing collar (165) may be may any configuration or material capable of securing the at least one tube (110) to form a tube assembly (115). The tube securing collar (165) may be threaded collar. The tube securing collar (165) may be an adhesive wrapping. The tube securing collar (165) may be permanent, as with a first of an at least one tube (110) welded or soldered to a second of an at least one tube (110).

An at least one detent (210) may be placed within a first (outer) of an at least one tube (110) near the tube assembly proximal end (125) and inside from a friction minimizing collar (150A) near the tube assembly proximal end (125) in this configuration, an at least one detent (210) operates to secure motion of a second (inner) of an at least one tube (110) within a first (outer) of an at least one tube (110). This motion-securing action thereby prevents injury and damage from the second (inner) of an at least one tube (110) spontaneously exiting the first (outer) of an at least one tube (110) via the tube assembly proximal end (125).

Figure 3:
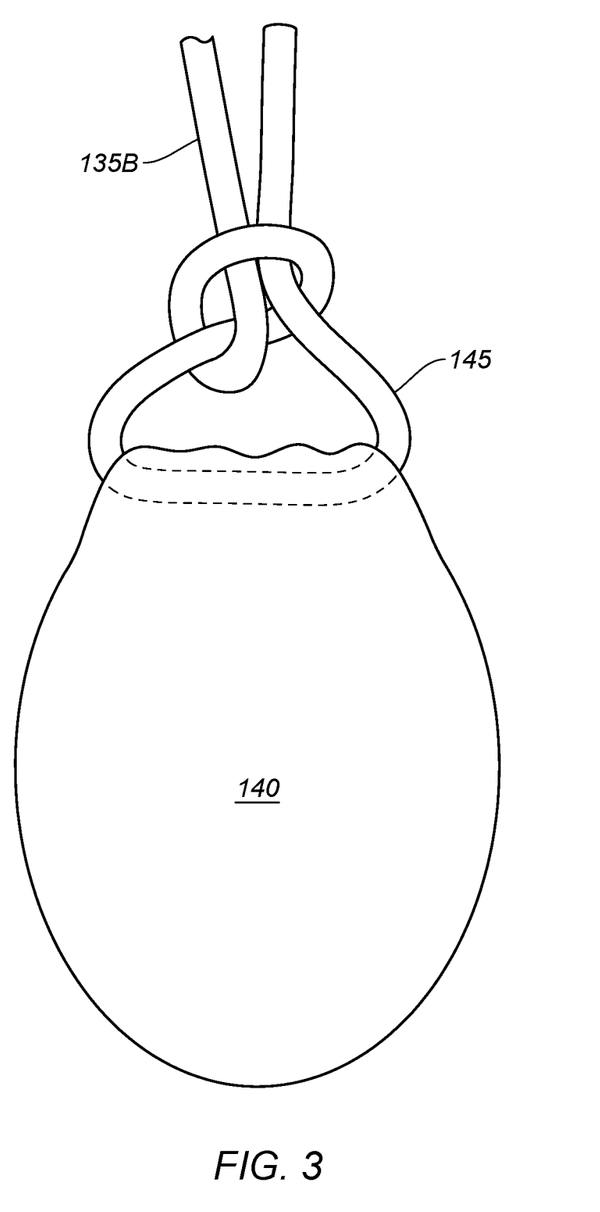
FIG. 3 shows a portion of the entertainment and training device for animals (100). Shown in FIG. 3 are the first flexible and durable material (135), an at least one affixment device (145), and an at least one target object (140).

FIG. 3 shows a portion of the entertainment and training device for animals (100). Shown in FIG. 3 are the first flexible and durable material (135), an at least one affixment device (145), and an at least one target object (140).

In the configuration shown in FIG. 3, the first flexible and durable material (135) is coupled to an at least one affixment device (145), which is coupled to an at least one target object (140).

The at least one affixment device (145) provides for (1) controlled deployment of the at least one target object (140), (2) for ease of retrieval of the at least one target object (140) to the at least one tube (110), and (3) use of the first flexible and durable material (135) as part of the entertainment or training exercise.

In one possible configuration, as when the first flexible and durable material (135) comprises a flexible natural material and the at least one target object (140) may comprise a loop of the first flexible and durable material (135) for attachment, the first flexible and durable material (135) may be looped and knotted to the at least one target object (140).

As previously described, the first flexible and durable material (135) may be made of many materials. Considering then, the many possible configurations of activities and animals for use of the entertainment and training device for animals (100), many possible options likewise exist for the at least one target object (140).

Other possible configurations of the at least one affixment device (145) for coupling tie first flexible and durable material (135) to the at least one target object (140) include a spring clip attached to the first flexible and durable material (135) and a D-ring attached to the at least one target object (140). As many types of animals may use the entertainment and training device for animals (100), additional and appropriate safety materials may be needed.

Another possible configurations for the at least one affixment device (145) is use of other flexible but durable materials. A leader line, for example, might be made of soft metal or plastic. The at least one affixment device (145) material and size might be based on wear factors, such as, size of the animal, weight of the animal, size of the at least one target object (140), weight of the at least one target object (140), and terrain of use, i.e., an empty field presents different wear and hazards than a field of trees and various plants.

Figure 4:
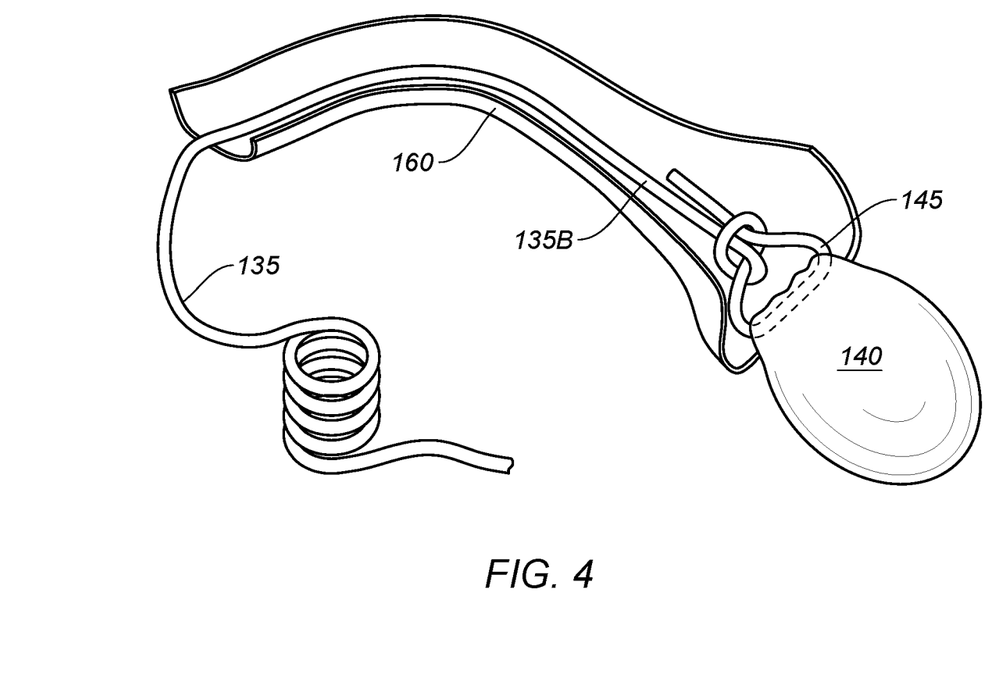
FIG. 4 shows a portion of the entertainment and training device for animals (100). Shown in FIG. 4 is the first flexible and durable material (135), the at least one target object (140), and a second flexible and durable material (160).

FIG. 4 shows a portion of the entertainment and training device for animals (100). Shown in FIG. 4 is the first flexible and durable material (135), the at least one target object (140), and a second flexible and durable material (160).

The first flexible and durable material (135) may be partially within a second flexible and durable material (160) as a covering near and over the coupling location at the at least one target object (140) to operate to provide additional durability to the first flexible and durable material (135).

Placing a second flexible and durable material (160) as a cover over the first flexible and durable material (135) near and over the at least one affixment device (145) operates to (1) minimize damage to the first flexible and durable material (135) when grasped by an animal, and (2) protects the animal from injury by the at least one affixment device (145).

The second flexible and durable material (160) may be any material capable of (1) minimizing damage to the first flexible and durable material (135) when grasped by an animal, and (2) protecting the animal from injury by the coupling mechanism. The second flexible and durable material (160) may be made of a natural material such as padded canvas, cotton, hemp or jute, a synthetic material such as ballistic nylon, plasticized-polyvinyl chloride, polypropylene, or a natural-synthetic blend.

FIGS. 5A, 5B, 5C, 5D and 5E show various configurations of the at least one target object (140) of the entertainment and training device for animals (100).

Figure 5A:
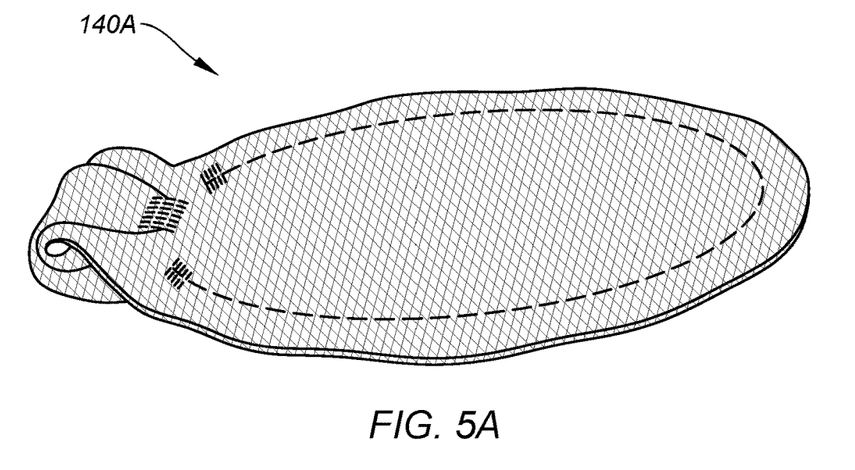
FIGS. 5A, 5B, 5C, 5D and 5E show various configurations of an at least one target object (140) of the entertainment and training device for animals (100).

FIG. 5A shows an at least one target object (140A) may have an appearance as a flat disk, i.e. a flat appearance, e.g., not filled or minimally filled to not have a rounded upper or lower surface. The flat disk configuration may be made from water-repellant treated material or water-repellant material such that the flat disk will float on water.

Figure 5B:
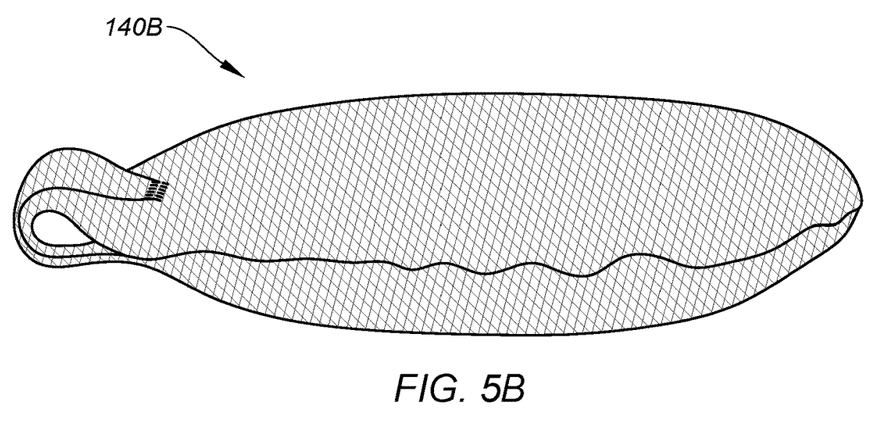

FIG. 5B shows an at least one target object (140B) which has an appearance as an oblong disk. The oblong disk may be filled to have a rounded upper or lower surface such that the oblong disk has an oblong surface with a rounded surface transverse to the oblong surface. The oblong disk configuration may contain a stuffing material to provide an object which an animal may grasp. The oblong disk configuration may provide additional use for play, such as for tug of war.

Figure 5C:
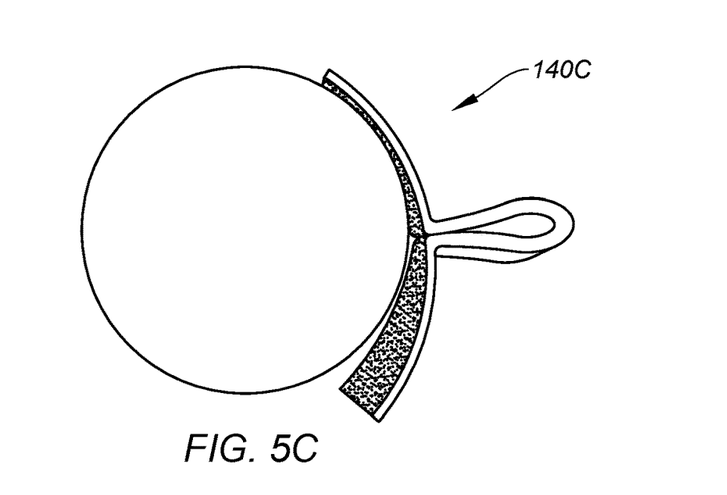

FIG. 5C shows an at least one target object (140C) which has an appearance as a ball. This configuration may use a holding (hook) material attached to the at least one affixment device (145) for connecting a cloth or loop surface ball to a holding (hook) surface. The loop and hook surfaces may be swapped.

Figure 5D:
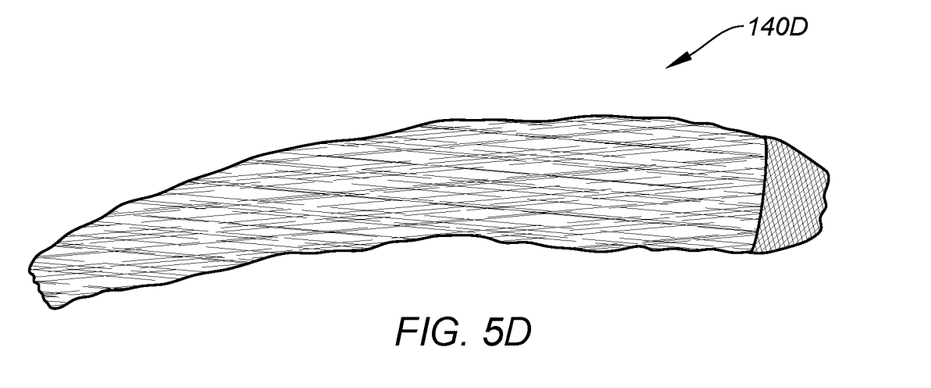

FIG. 5D shows an at least one target object (140D) which has an appearance as a tail. The tail may be made of a 'furry' material (e.g., pile or shag) sewn to a collar for attaching to the at least one affixment device (145). A backing cloth or other material may be used to provide durability against wear.

Figure 5E:
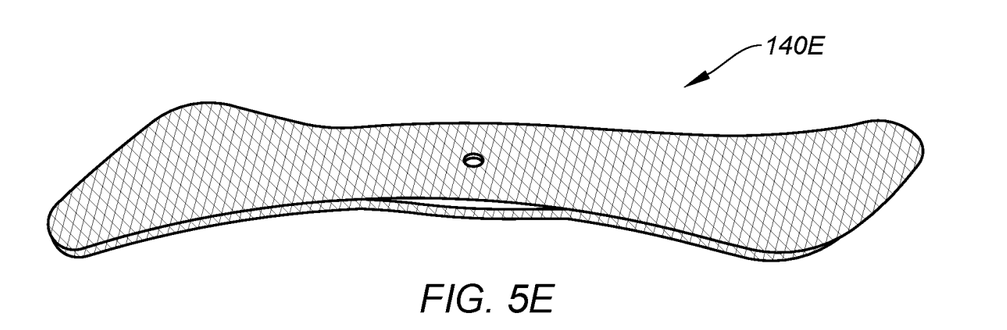

FIG. 5E shows an at least one target object (140E) which has an appearance as a wing. The wing configuration provides a flight appearance in use and additional play and training opportunities. This flight appearance may include a whipping action.

Figure 5F:
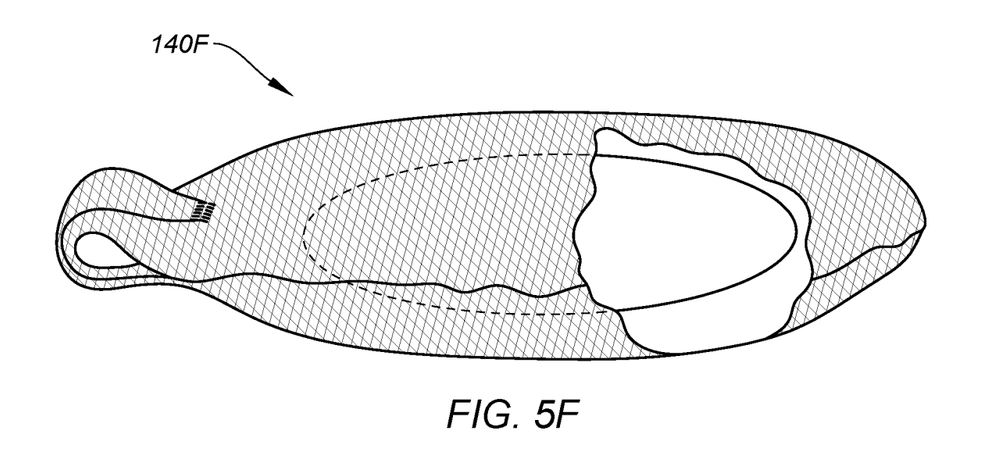
FIG. 5F shows that the an at least one target object (140) may have a target object inner pouch (180).

FIG. 5F shows an at least one target object (140) may have a target object inner pouch (180). The target object inner pouch (180) may be a closed inner pouch, an open inner pouch, or a sealable inner pouch. The target object inner pouch (180) may be used to hold a squeaking device. The target object inner pouch (180) may be used to hold a reward treat.

Figure 5G:
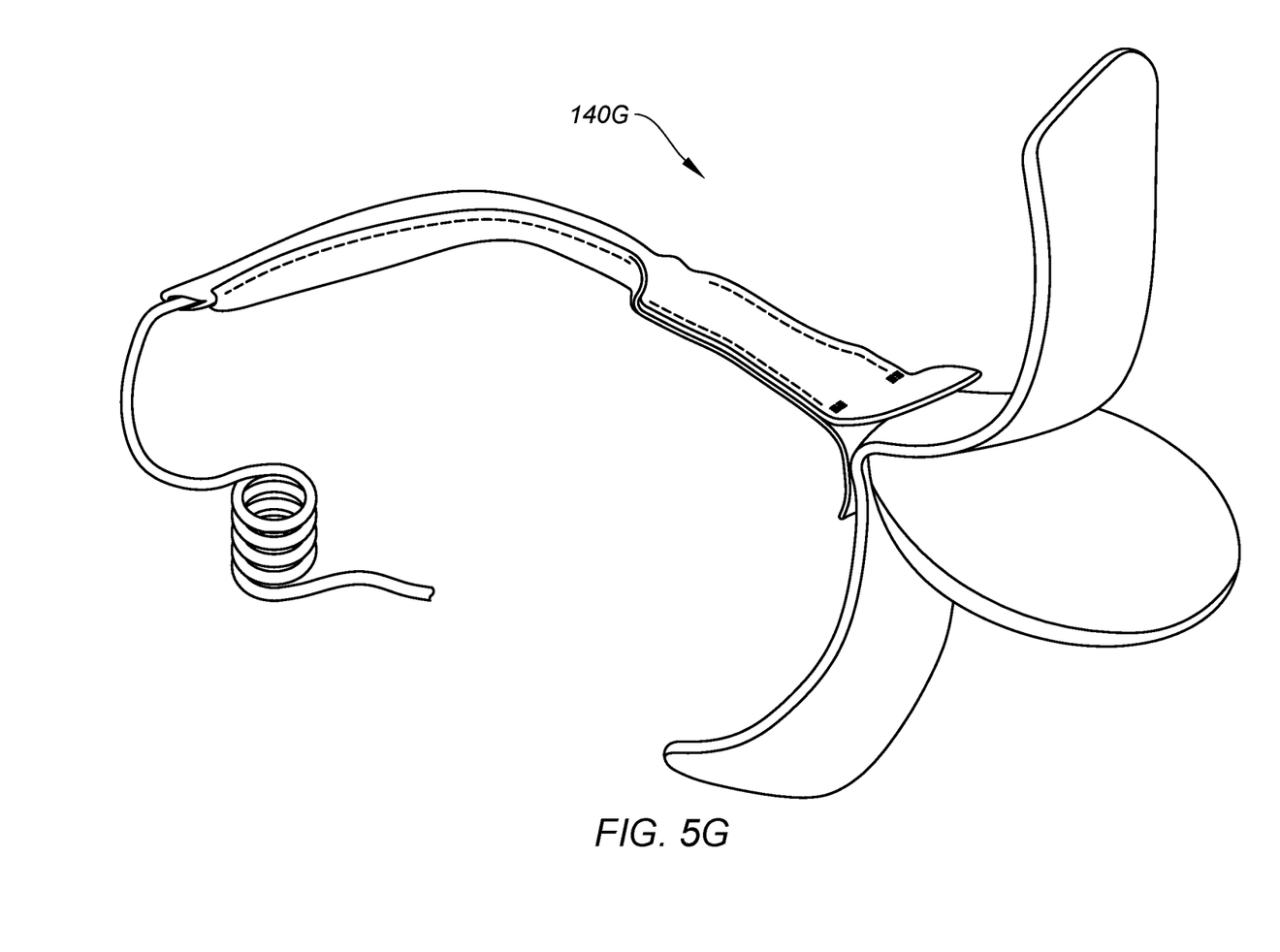
FIG. 5G shows a plurality configuration of the an at least one target object (140).

FIG. 5G shows a plurality configuration of the an at least one target object (140). In this configuration, the an at least one target object (140) comprises a wing (FIG. 5E) configuration with an oblong disk (FIG. 5B) configuration. This configuration provides a flight appearance in use and additional play and training opportunities.

Figure 6:
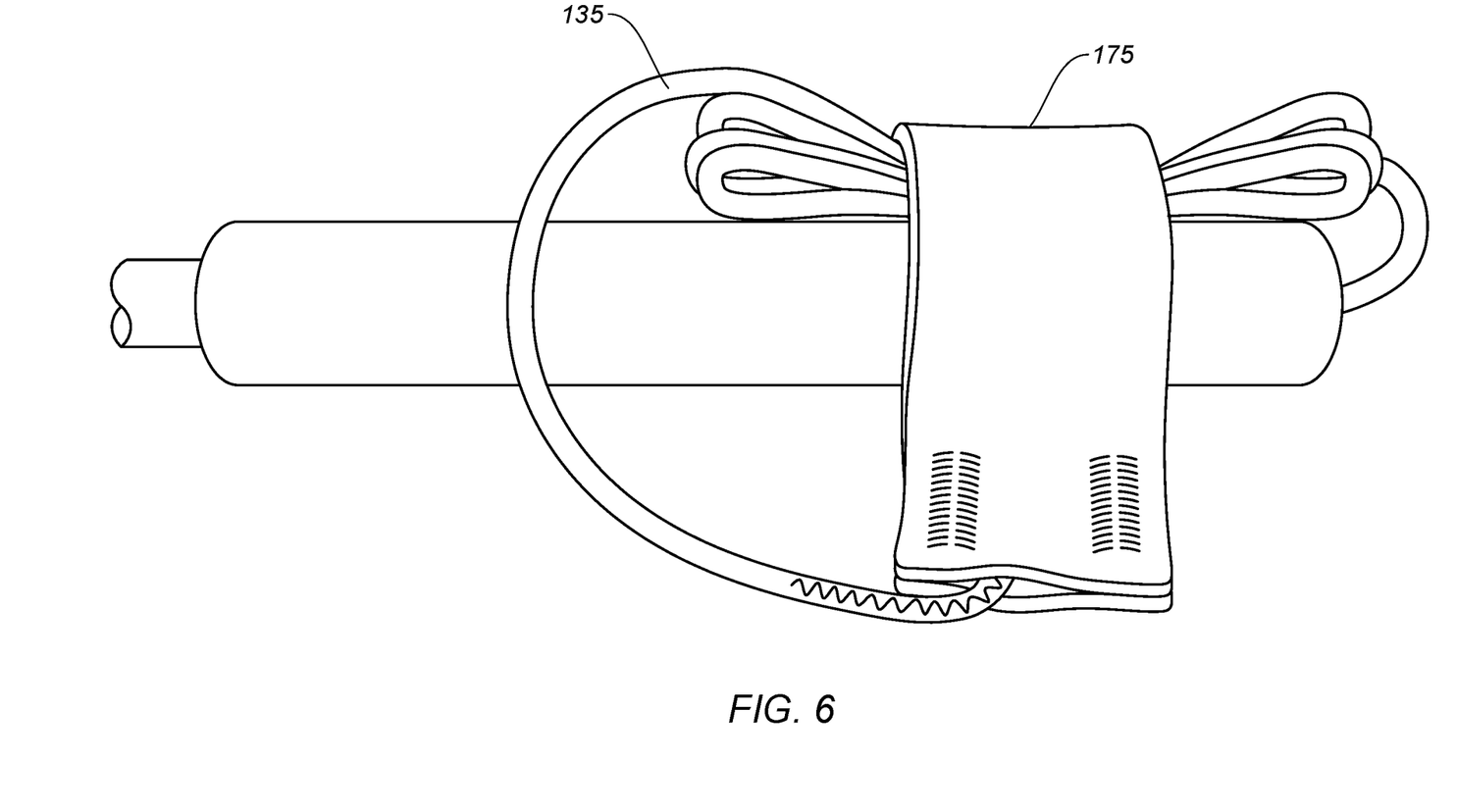
FIG. 6 shows a brake (175) used as a holster for the first flexible and durable material (135).

FIG. 6 shows a brake (175) used as a holster for the first flexible and durable material (135). Shown in FIG. 6 are a first flexible and durable material (135), a handgrip (170), and a brake (175). In this configuration, the brake (175) may be placed over one end of the entertainment and training device for animals (100), shown here as the proximal end, but the distal end would operate in some configurations, with the first flexible and durable material (135) coiled and inserted into the brake (175) used as a holster for the first flexible and durable material (135).

Figure 7:
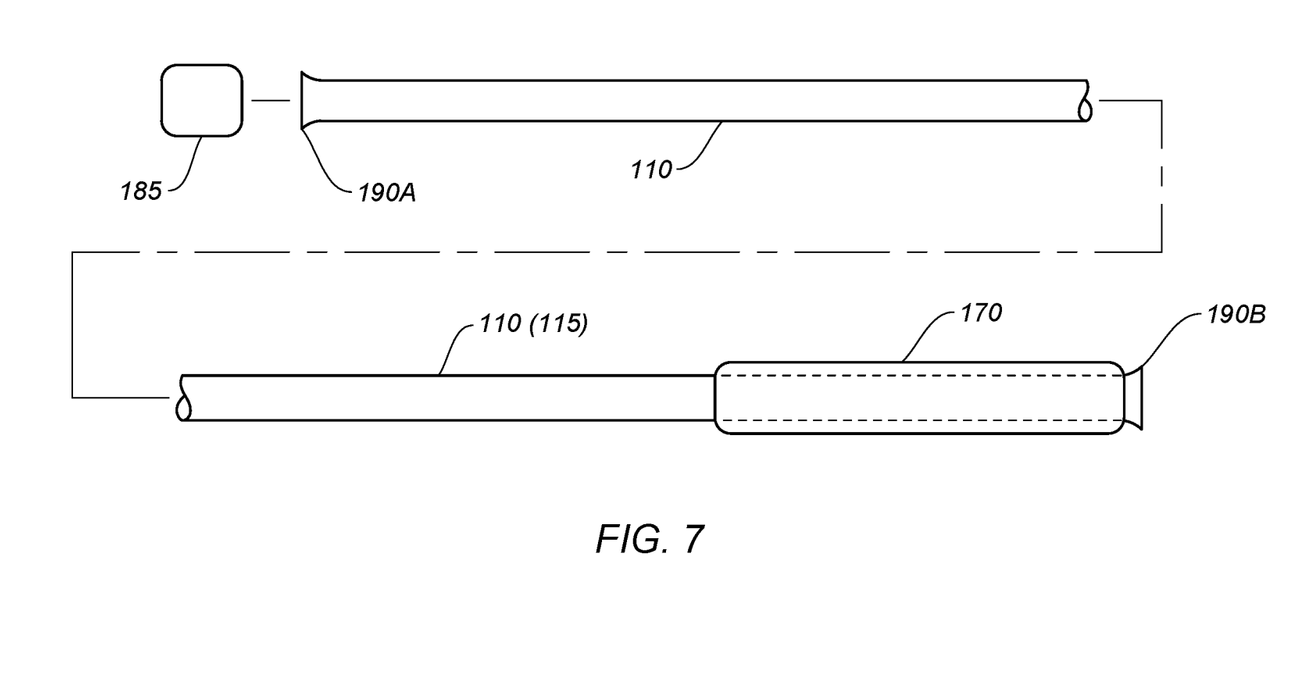
FIG. 7 shows an exploded view of a tube assembly for an entertainment and training device for animals (100).

FIG. 7 shows an exploded view of a tube assembly for an entertainment and training device for animals (100). Shown in FIG. 7 are an at least one tube (110) with the an at least one tube (110) forming a tube assembly (115), a handgrip (170), a distal end bumper (185), and in this configuration with a tube flare at both the tube assembly proximal end (125) as a proximal end tube flare (190B) and the tube assembly distal end (120) as a distal end tube flare (190A).

A distal end bumper (185) may be placed around the tube assembly distal end (120) of the at least one tube (110) to provide injury protection. The distal end bumper (185) may be made of any material providing a cushioning affect, including but not limited to open cell foam, closed cell foam or air packaged air. The distal end bumper (185) may be of any length or thickness. In one configuration, the distal end bumper (185) may range from 1 inch to 2.5 inches in length, and with a wall thickness of approximately ⅜ inch. A distal end bumper (185) should fit snuggly over the at least one tube (110). The distal end bumper (185) may be angularly cut at one side to fit over a tube flare (190) of the at least one tube (110).

A distal end tube flare (190A) placed at the tube assembly distal end (120) of the at least one tube (110) may be used to lessen edge friction as the first flexible and durable material (135) travels out of the tube assembly (115).

The an at least one tube (110) forming a tube assembly (115) may be configured with a distal end tube flare (190A) and a proximal end friction minimizing collar (150A).

Figure 8:
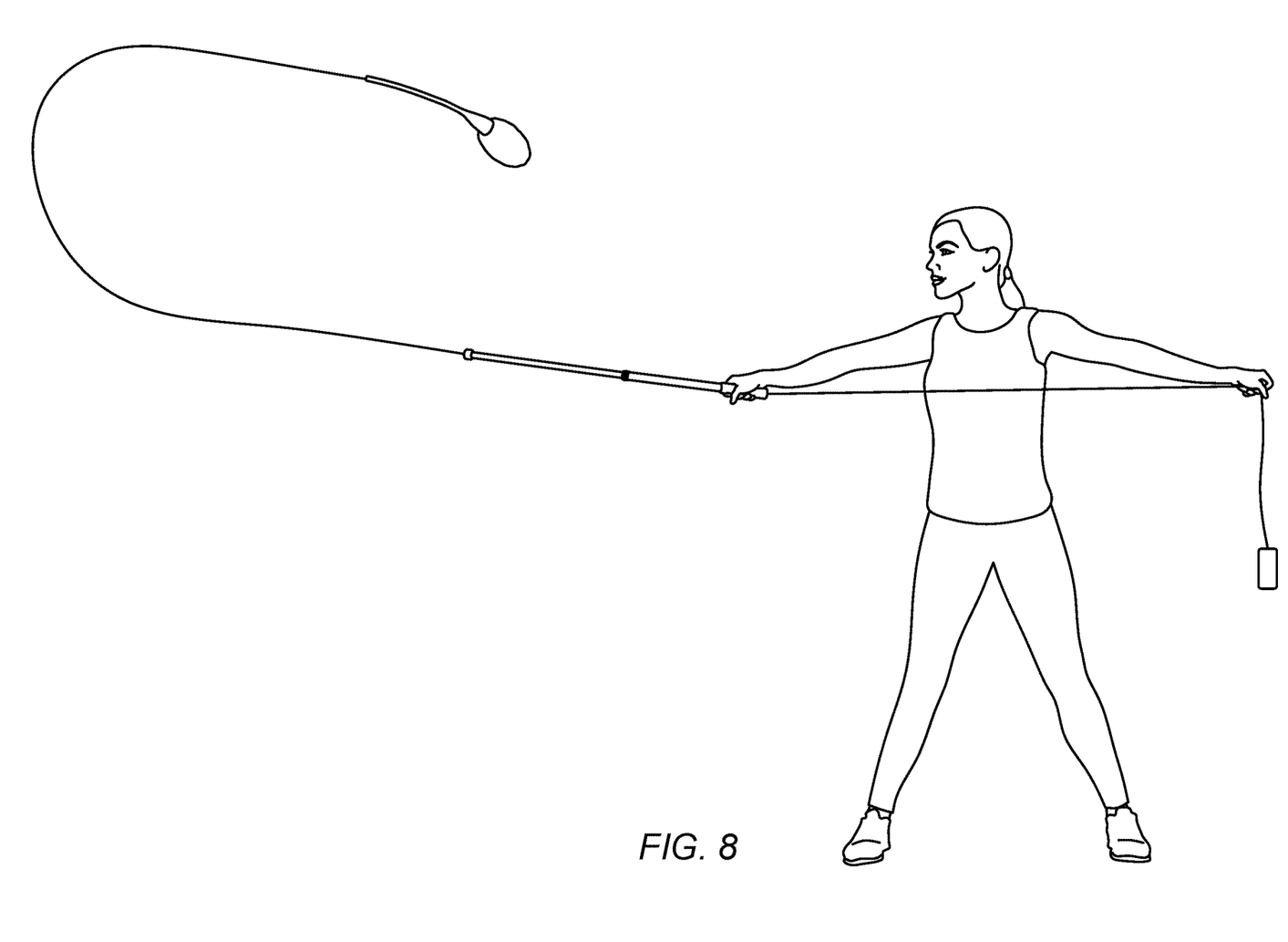
FIG. 8 shows an entertainment and training device for animals (100) in use.

FIG. 8 shows an entertainment and training device for animals (100) in use.

To use the entertainment and training device for animals (100), an operator should grasp the handgrip (170) with one hand, best performance may be achieved by use of the dominant hand, and then grasp the first flexible and durable material (135) at the tube assembly proximal end (125) with the free hand, and draw the an at least one target object (140) towards the tube assembly distal end (120).

One helpful technique is to allow the first flexible and durable material (135) to hang down from the entertainment and training device for animals (100). Caution: use care to avoid tripping on the first flexible and durable material (135) or wrapping the first flexible and durable material (135) around the leg of the user or around an animal. Do not wind the first flexible and durable material (135) around the hand as the first flexible and durable material (135) could tighten on the hand during use.

Grasp the first flexible and durable material (135) with the free hand near the tube assembly proximal end (125) and while holding the first flexible and durable material (135) taut, raise the tube assembly distal end (120) of the entertainment and training device for animals (100) behind you. Holding the entertainment and training device for animals (100) as high as possible, rotate your arm forward and as the tube assembly distal end (120) of the entertainment and training device for animals (100) reaches the top of travel, loosen your grip on the first flexible and durable material (135) to allow the an at least one target object (140) to travel forward and pull the first flexible and durable material (135) into and through the entertainment and training device for animals (100).

The brake (175) will stop travel of the an at least one target object (140). In the alternative, as to dispense a desired length of the first flexible and durable material (135), the desired length of the first flexible and durable material (135) may be allowed to hang free from the entertainment and training device for animals (100) with a portion held by the grasping hand against the handgrip (170) with the remainder of the first flexible and durable material (135) hanging free from the grasping hand.

Play and retrieval of the an at least one target object (140) may then be executed. Additional exercises, including tug of war, are possible.

The entertainment and training device for animals (100) may be configured for the tube assembly (115) to have a determinate length (130) for a specific activity and the specific activity. If used with smaller animals, the tube assembly (115) may have a length of less than one meter. If used with larger animals, the tube assembly (115) may have a length of more than one meter.

Similarly, the first flexible and durable material (135) may have a designated length for a specific activity and the specific animal. In some configurations, the first flexible and durable material (135) may have a length of two to five meters. In some configurations, the first flexible and durable material (135) may have a length of more than five meters.

These descriptions and drawings are embodiments and teachings of the disclosure. All variations are within the spirit and scope of the disclosure. This disclosure is not to be considered as limiting the claims to only the embodiments illustrated or discussed. Certain changes can be made in the subject matter without departing from the spirit and the scope of this invention. Changes are possible within the scope of this invention. Each structure or element recited in any claim also refers to all equivalent structures or elements. Use of the terms first and second are understood to signify that more than two may be present, as with a first, a second, a third, etc. The following claims are intended to cover the invention as broadly as possible in whatever form it may be used.

What is claimed is:

1. An entertainment and training device for animals (100) comprising
    a tube assembly (115) comprising a first of an at least one tube (110) wherein the tube assembly (115) comprises a tube assembly distal end (120) and a tube assembly proximal end (125),
    a first flexible and durable material (135) capable of travel within the tube assembly (115) wherein the first flexible and durable material (135) is coupled at a distal end (135B) of the first flexible and durable material (135) to an at least one affixment device (145) which is coupled to an at least one target object (140) and wherein the first flexible and durable material (135) is coupled at a proximal end (135A) of the first flexible and durable material (135) to a brake (175) capable of ceasing travel of the first flexible and durable material (135),
    a second flexible and durable material (160) uncoupled to the first flexible and durable material (135) and uncoupled to the at least one affixment device (145) and uncoupled to the at least one target object (140) for covering the distal end (135B) of the first flexible and durable material (135) for providing a protective surface over the distal end (135B) of the first flexible and durable material (135) and to the at least one affixment device (145) at the at least one target object (140) to prevent bite damage to the first flexible and durable material (135) and to the at least one affixment device (145) and to prevent injury to an animal from biting the at least one least affixment device (145), and
    a handgrip (170) placed around the tube assembly proximal end (125) and capable of providing a graspable surface for holding onto the entertainment and training device for animals (100).

2. The entertainment and training device for animals (100) of claim 1 further comprising a tube securing collar (165) for coupling the first of an at least one tube (110) to a second of an at least one tube (110).

3. The entertainment and training device for animals (100) of claim 1 wherein the at least one tube (110) is transparent.

4. The entertainment and training device for animals (100) of claim 1 wherein the at least one tube (110) is translucent.

5. The entertainment and training device for animals (100) of claim 1 wherein the at least one tube (110) is opaque.

6. The entertainment and training device for animals (100) of claim 1 wherein the at least one tube (110) comprises a metal tube.

7. The entertainment and training device for animals (100) of claim 1 wherein the at least one tube (110) comprises a plastic tube.

8. The entertainment and training device for animals (100) of claim 1 wherein the at least one tube (110) comprises reinforced paper tube.

9. The entertainment and training device for animals (100) of claim 1 wherein the tube assembly (115) comprises a determinate length (130) of less than one meter.

10. The entertainment and training device for animals (100) of claim 1 wherein the at least one tube (110) comprising a tube assembly (115) comprises a determinate length (130) of at least one meter.

11. The entertainment and training device for animals (100) of claim 1 wherein the at least one target object (140) comprises a disk having a flat appearance.

12. The entertainment and training device for animals (100) of claim 1 wherein the an at least one target object (140) comprises a disk having an oblong surface with rounded surface transverse to the oblong surface.

13. The entertainment and training device for animals (100) of claim 1 wherein the an at least one target object (140) comprises a ball.

14. The entertainment and training device for animals (100) of claim 1 wherein the an at least one target object (140) comprises an appearance of a tail.

15. The entertainment and training device for animals (100) of claim 1 wherein the at least one target object (140) comprises an appearance of a wing.

16. The entertainment and training device for animals (100) of claim 1 wherein the at least one target object (140) comprises a closed inner pouch.

17. The entertainment and training device for animals (100) of claim 1 wherein the at least one target object (140) comprises an open inner pouch.

18. The entertainment and training device for animals (100) of claim 1 wherein the at least one target object (140) comprises a sealable inner pouch.

19. The entertainment and training device for animals (100) of claim 1 wherein the at least one target object (140) comprises an inner pouch comprising a sound emitting device.

20. The entertainment and training device for animals (100) of claim 1 wherein the at least one target object (140) comprises a water-repellant treated material and is capable of floating on water.

21. The entertainment and training device for animals (100) of claim 1 wherein the at least one target object (140) comprises a woven material of at least 1000 denier.

22. The entertainment and training device for animals (100) of claim 1 wherein the second flexible and durable material (160) comprises a woven material of at least 1000 denier.

23. The entertainment and training device for animals (100) of claim 1 wherein the tube assembly distal end (120) comprises distal end bumper (185).

24. The entertainment and training device for animals (100) of claim 1 wherein the tube assembly distal end (120) comprises a distal end tube flare (190).

25. The entertainment and training device for animals (100) of claim 1 wherein the an at least one tube (110) comprises a detent (210) capable of securing a second of an at least one tube (110) within a first of an at least one tube (110).

26. The entertainment and training device for animals (100) of claim 1 wherein the tube assembly distal end (120) comprises a distal end tube flare (190A) and the tube assembly distal end (120) comprises a proximal end friction minimizing collar (150A).

\* \* \* \* \*